United States Patent [19]

Tabei

[11] Patent Number: 4,858,025
[45] Date of Patent: Aug. 15, 1989

[54] ELECTRONIC STILL CAMERA

[75] Inventor: Masatoshi Tabei, Kanagawa, Japan

[73] Assignee: Fuji Photo Film Co., Ltd., Kanagawa, Japan

[21] Appl. No.: 96,568

[22] Filed: Sep. 3, 1987

[30] Foreign Application Priority Data

Sep. 3, 1986 [JP] Japan ............................. 61-205756
Sep. 29, 1986 [JP] Japan ............................. 61-228435

[51] Int. Cl.$^4$ ............................................. H04N 5/92
[52] U.S. Cl. ................................ 358/310; 358/322; 358/909; 360/35.1
[58] Field of Search ............... 358/322, 906, 909, 310; 360/8, 9.1, 22, 23, 35.1

[56] References Cited

U.S. PATENT DOCUMENTS 4,750,057 6/1988 Baumeister ..................... 360/35.1
4,752,838 6/1988 Nutting ........................... 360/9.1

Primary Examiner—L. T. Hix
Assistant Examiner—David M. Gray
Attorney, Agent, or Firm—Sughrue, Mion, Zinn, Macpeak & Seas

[57] ABSTRACT

A still picture recording and reproduction apparatus in which a still picture imaged on a frame transfer CCD is recorded on a rotary magnetic disk and then read for display on a TV using interlace scanning with A-fields and B-fields, corresponding to odd and even numbered lines are separately read and then time expanded. The time expansion may be performed on reproducing from the magnetic disk or performed on recording on separate tracks of the disk in which case one of the fields is time delayed to make the two types of fields to be in phase.

4 Claims, 5 Drawing Sheets

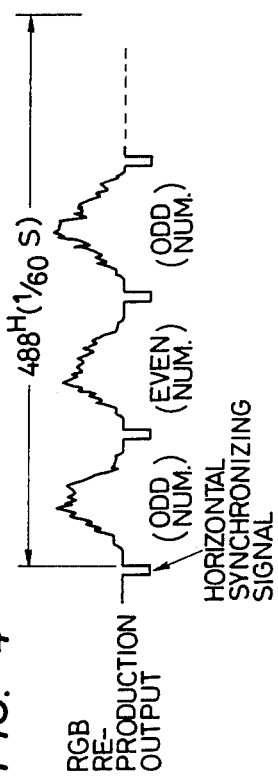
FIG. 4
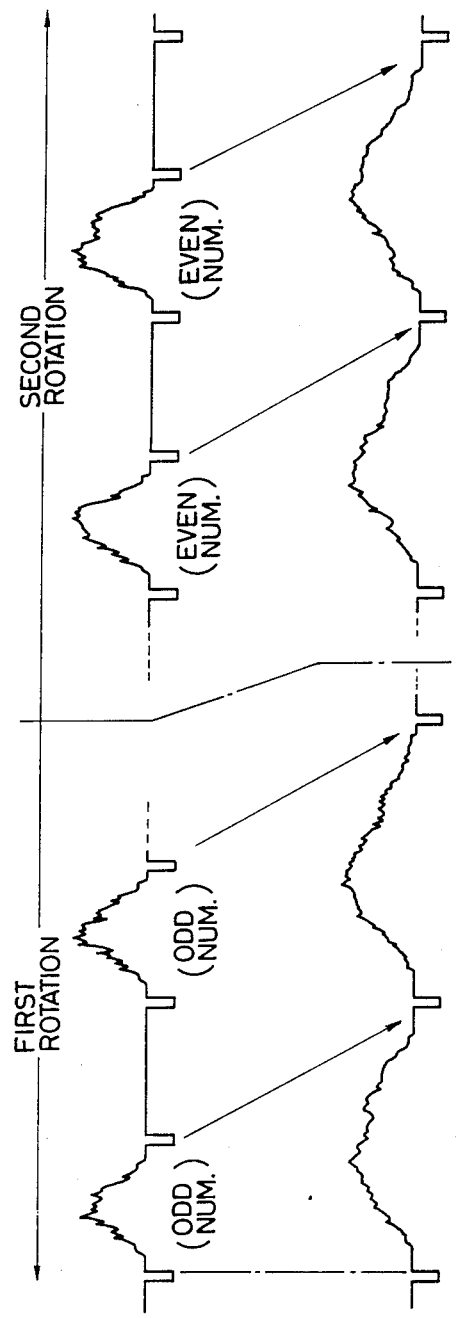
FIG. 5
FIG. 6

ELECTRONIC STILL CAMERA

BACKGROUND OF THE INVENTION

1. Field of the Invention

The present invention generally relates to an electronic still camera using a CCD (charge coupled device) of the frame transfer type.

The invention particularly relates to an electronic still camera in which a field signal produced from a CCD of the frame transfer type is converted into a signal equivalent to a storage frame and is recorded on a rotatable magnetic recording medium having a small diameter.

Further, the present invention also relates to a method of reading a still picture recorded on a magnetic disk.

More particularly, it relates to a method of reading a still picture in which a still picture is read by converting a reproduced signal obtained from noninterlace signal recorded according to sequential areas into an interlace signal which is suitable to be watched by a television receiver.

2. Background of the Invention

Generally, in the case where a CCD of the frame transfer type (hereinafter referred to as an FTCCD) is used for a movie, the FTCCD can produce a frame signal having vertical picture elements, the number of which is equal to that of TV scanning lines through 2:1 interlace-scanning.

On the other hand, in the case where such an FTCCD as described above is applied to an electronic still camera to pick up a still picture, only a field signal of one scene can be obtained as an output signal for one shot. Therefore, there has been such a disadvantage that the original resolution of the FTCCD cannot be sufficiently utilized.

In order to eliminate the foregoing disadvantage, there has been proposed a system in which a signal charge is transferred from a CCD light reception section to a CCD storage section a single time in a very short period during one shot exposure to thereby make it possible to utilize a picture signal of two fields for the formation of a reproduced picture. In this system, although the exposure is continued during this signal charge transfer period, the transfer period is significantly shorter than the exposure period. Therefore, the picture quality is not degraded so much even though light reception elements of the CCD light reception section which are transferring the signal charge are irradiated so that a signal charge corresponding to a displaced image is superimposed on that to be transferred.

In the foregoing system, however, when the exposure period cannot be established to be sufficiently long relative to the extremely short transfer period, for example, when a high-speed shutter is applied to the system, there is a possibility that the exposure during the transfer period exerts a deleterious influence on the picture quality.

On the other hand, the inventors of this application have proposed a solid state image pickup element which can produce, in sequence for the red, green and blue (R, G, B) areas, a picture signal obtained by imaging a subject. They have also proposed an electronic still camera in which a picture signal is recorded on a magnetic disk having a small diameter by using this solid state image pickup element.

FIG. 1 is a diagram for explaining the foregoing solid state image pickup element and electronic still camera.

In a solid state image pickup element 10, microcolor filters (represented by symbols R, G, and B in the drawing) are arranged not only on a photoelectric conversion section 12 but also on a vertical transfer line 11 of a conventionally known CCD of the interline transfer type. This dual placement of the micro-color filters thereby provides a photoelectric conversion function also in the vertical transfer line 11. Signal charges stored in the vertical transfer line 11 and in the photoelectric conversion portion 12 are output in the area sequence of R, G, and B from a buffer amplifier 14 through a single horizontal CCD 13.

In the electronic still camera to which this solid state image pickup element 10 is applied, picture signals obtained by picking up a subject and output in area sequence are distributed to three magnetic heads 16 respectively corresponding to three colors R, G, and B through an area change-over or demultiplexer circuit 1. Thereby, the three magnetic heads 16 magnetically record the picture signals on three corresponding tracks of a magnetic disk 17.

Reproduction is performed in such a manner that the connection of a recording/reproducing change-over switch 18 is changed over to the reproducing side. Then, the three tracks are simultaneously reproduced by the three corresponding magnetic heads 16 used as reproducing heads to thereby provide, for example, a printed picture. Although the thus arranged electronic still camera is of the single plane type, the same color reproducing property and resolution can be obtained as in the case where an image pickup operation is performed by a camera of the three-plane type. Also, a clear color picture can be obtained because of an improved signal-to-noise (S/N) ratio. Further, being of the single plane type, the electronic still camera can be reduced in size as well as in weight.

Thus, the solid state image pickup element and the electronic still camera using the element have the foregoing superior features in comparison with the conventional ones. However, there has been an inconvenience in the case where a reproduced picture obtained by the electronic still camera is desired to be watched by an ordinary television system.

That is, there has been a disadvantage in that the area-sequential signal produced from the solid state image pickup element is a non-interlace signal which is recorded as a frame through full vertical scanning of all the scanning lines. However, a signal to be used in an ordinary television receiver is, as well known, an interlace signal obtained through interlace-scanning of the scanning lines. Therefore, the non-interlace signal is improper for such an ordinary television receiver.

SUMMARY OF THE INVENTION

It is therefore an object of the present invention to eliminate the foregoing disadvantages.

More specifically, an object of the present invention to provide an electronic still camera in which characteristics of an FTCCD are effectively utilized independently of the foregoing conventional system to thereby obtain a clear reproduced still picture.

It is a further object of the present invention to provide an electronic still camera in which a picture signal to be recorded on a magnetic recording medium can be recorded as a standard signal.

It is a still further object of the present invention to provide a method of reading a still picture which can supply an interlace signal to a television receiver from a non-interlace signal recorded in area sequence on a magnetic disk.

According to the present invention, picture signals of A- and B-fields which are picked up by an FTCCD are respectively recorded as standard signals on two corresponding tracks of a rotary magnetic recording medium so as to be reproduced as a signal equivalent to a frame storage obtained by interlace-scanning. Accordingly, a high resolution still picture can be obtained.

In order to attain the above objects, according to an aspect of the present invention, the electronic still camera comprises a dark box (camera case), a focusing optical system, a shutter and a CCD of the frame transfer type which has vertical picture elements substantially equal in number to television scanning lines and which is arranged to be able to produce a picture signal corresponding to one frame for 1/60 sec. The camera further comprises a field change-over means for distributing an output of the CCD of the frame transfer type into a picture signal of an A-field and a picture signal of a B-field. A delay circuit delays one of the A-field picture signal and the B-field picture signal so as to make the A-field picture signal and the B-field picture signal be coincident in phase with each other. A time base correction circuit doubly expands a time base of each of waveforms of the A-field signal and the B-field signal which are made to be in phase. Thereby the two field signals which are expanded in time base can be simultaneously recorded on two tracks of a rotary magnetic recording medium by a two-channel head.

According to another aspect of the present invention, the method reads a still picture in which respective picture signals for a plurality of colors obtained by color separation are recorded in area sequence on tracks of a magnetic disk. The method comprises the steps of reproducing the magnetic disk at a double speed and at the same time rotating the magnetic disk twice so as to repeatedly reproduce one and the same track in a manner so that one of a signal for an odd number field and a signal for an even number field is selected in the first time reproduction and the other which has not been selected in the first time reproduction is selected in the second time reproduction. The time base of each of the one and the other selected signals is doubly expanded. The time base expanded signals are produced as an output.

BRIEF DESCRIPTION OF THE DRAWINGS

The above and other objects, features, and advantages of the present invention will be apparent from the following detailed description taken in conjunction with the accompanying drawings, in which:

FIGS. 4 to 6 are diagrams for explaining the method of reading a still picture according to the present invention, in which FIG. 4 is a diagram showing a reproduced output from one track of a magnetic disk on which a picture signal is recorded in area sequence, FIG. 5 is a waveform for explaining the step in which only one field, either of the odd number or of the even number, is sampled from the reproduced output illustrated in FIG. 4 with the non-sampled field being abandoned, and FIG. 6 shows a final output obtained by doubly expanding the waveform of FIG. 5 in time base.

DETAILED DESCRIPTION OF THE PREFERRED EMBODIMENTS

Several embodiments according to the present invention will be described with reference to the accompanying drawings hereunder.

Figure 2:
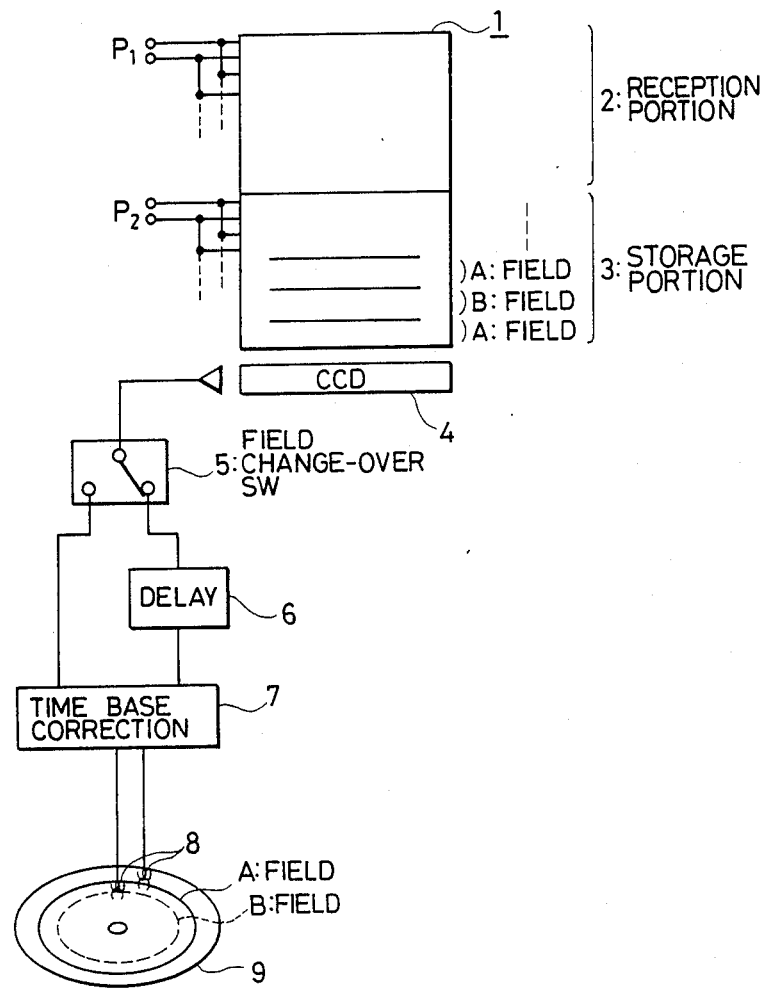
FIG. 2 is a diagram for explaining the main portion of an embodiment of the electronic still camera according to the present invention.

FIG. 2 is a diagram showing the main portion of an embodiment of the electronic still camera according to the present invention.

An FTCCD (frame transfer charge-coupled device) is used as a solid state image pickup element applied to the electronic still camera according to the present invention.

The FTCCD 1 is disposed in a light path in a dark box (not shown for simplifying the drawing). An image of a subject is focused on a light reception section 2 of the FTCCD 1 through a focusing optical system and a shutter (not shown for the same reason). When signal charges have been formed by exposure in the light reception section 2 in accordance with the brightness of the image of the subject, the charges are transferred to a storage section 3 of the FTCCD 1 during a vertical blanking period. The signal charges are further transferred to a horizontal CCD 4 by a quantity corresponding to one scanning line in a horizontal blanking period so as to be read out as a sequential signal.

Now, in the FTCCD 1, the number of vertical picture elements is made to be equal to that of television horizontal scanning lines, for example, 448 lines. Vertical transfer clocks $P_1$ and $P_2$ for driving the light reception section 2 and the storage section 3 respectively are driven at a frequency twice as high as a normal one so as to output a picture signal corresponding to a frame storage for 1/60 sec. Therefore, in this case, an A-field signal and a B-field signal are alternately read out of the horizontal CCD 4 corresponding to the number of scanning lines every ½ H period (the term "1H period" in this case means a 1H period in an ordinary NTSC system, that is, about 63 μs). That is, alternate rows of the FTCCD 1 are occupied by the A-field and the B-field and the horizontal CCD 4 scans a row every 1H period.

Even if the thus read sequential signal is recorded as it is, it is impossible to obtain a desired signal, that is, a signal which is equivalent to frame storage obtained by interlace-scanning.

Accordingly, in the electronic still camera according to the present invention, the sequential signal read out of the horizontal CCD 4 is supplied to a field change-over switch 5, the connection of which is changed over every ½ H period so that the sequential signal is distributed into an A-field signal and a B-field signal. There is a difference in phase between one distributed signal, for example, the A-field signal corresponding to the odd-numbered ones of the scanning lines, and the other distributed signal, that is, the B-field signal corresponding to the even-numbered scanning lines. Therefore, the A-field signal which has been read first is supplied to a delay circuit 6 so as to be delayed by a ½ H period. The A- and B-field signals made to be in phase by the delay of a ½ period have waveforms compressed in time base to be ½ of that of an ordinary television signal with half of the waveform vacant. Therefore, these signals are supplied to a time base correction circuit 7 so as to be corrected in such a manner that the respective time bases thereof are doubly expanded to uniformly fill the 1H period. The order of the time delay and the time base correction can be reversed. Each of the A- and B-field signals which have been time-base corrected is subject to ordinary signal processing, that is, arithmetic processing, so as to be converted into a luminance signal and a color difference signal. The so processed signals are then simultaneously recorded, after frequency-modulation, on two tracks of a rotary floppy disk 9 by two magnetic heads 8 respectively corresponding to the A- and B-fields.

During reproduction, the two tracks of the floppy disk 9 on which the respective picture signals have been recorded as described above are simultaneously reproduced by a 2-channel head to thereby obtain an interlaced standard signal.

Figure 3:
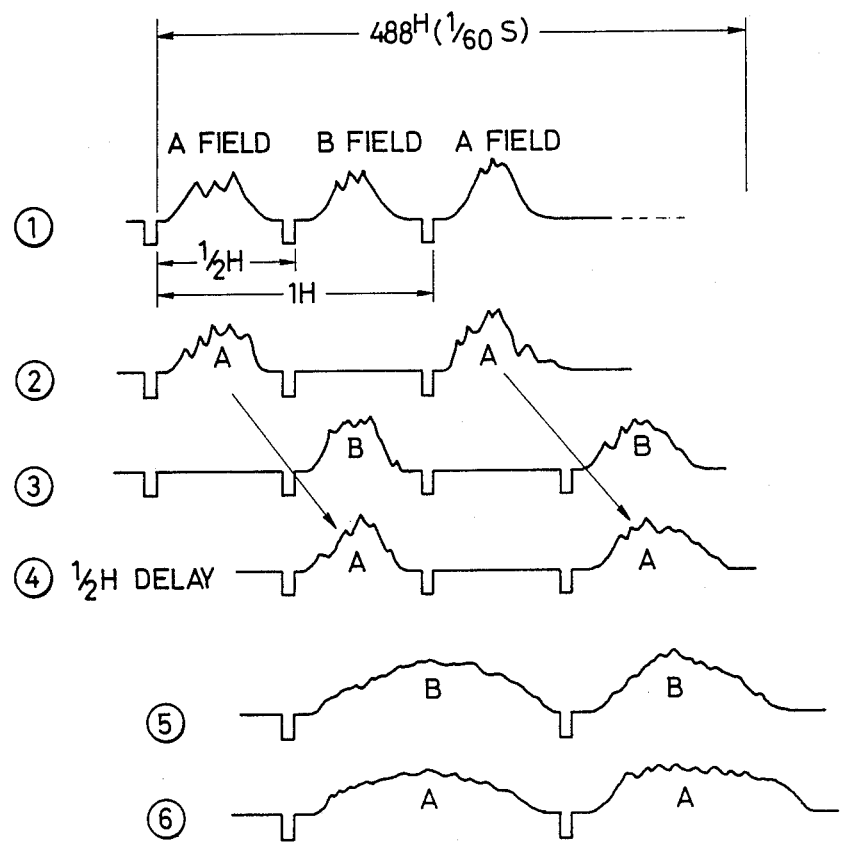
FIG. 3 is a diagram of signal waveforms for explaining the operation of the electronic still camera of FIG. 2.

FIG. 3 is a diagram of signal waveforms for explaining the foregoing process. The picture signal produced form the FTCCD 1 as shown in trace (1) in FIG. 3 is distributed by the field change-over switch 5 into the signals for the A- and B-fields respectively as shown in traces (2) and (3) in FIG. 3. The A-field signal is delayed by a ½ H period so as to coincide in phase with the B-field signal as shown in trace (4) in FIG. 3. Then, the A- and B-field signals are corrected so as to expand their time bases, as shown in traces (5) and (6) in FIG. 3, and are simultaneously recorded on the floppy disk 9.

Further, in the foregoing embodiment, for the time base correction circuit 7, it is possible to employ, for example, a BBD (bucket brigade device) which has been conventionally used for time base compression/expansion of a waveform of an audio signal, as an analog variable element having a simple arrangement.

As described above, in the electronic still camera according to the present invention, a signal equivalent to a frame storage is obtained by using an FTCCD and therefore a high resolution still picture can be obtained. Further, a picture signal is magnetically recorded as an interlaced standard signal. Therefore, the recorded picture signal can be reproduced by a television receiver or the like.

An alternative design will now be described which rearranges the reproducing rather than the recording of the floppy disk.

Figure 1:
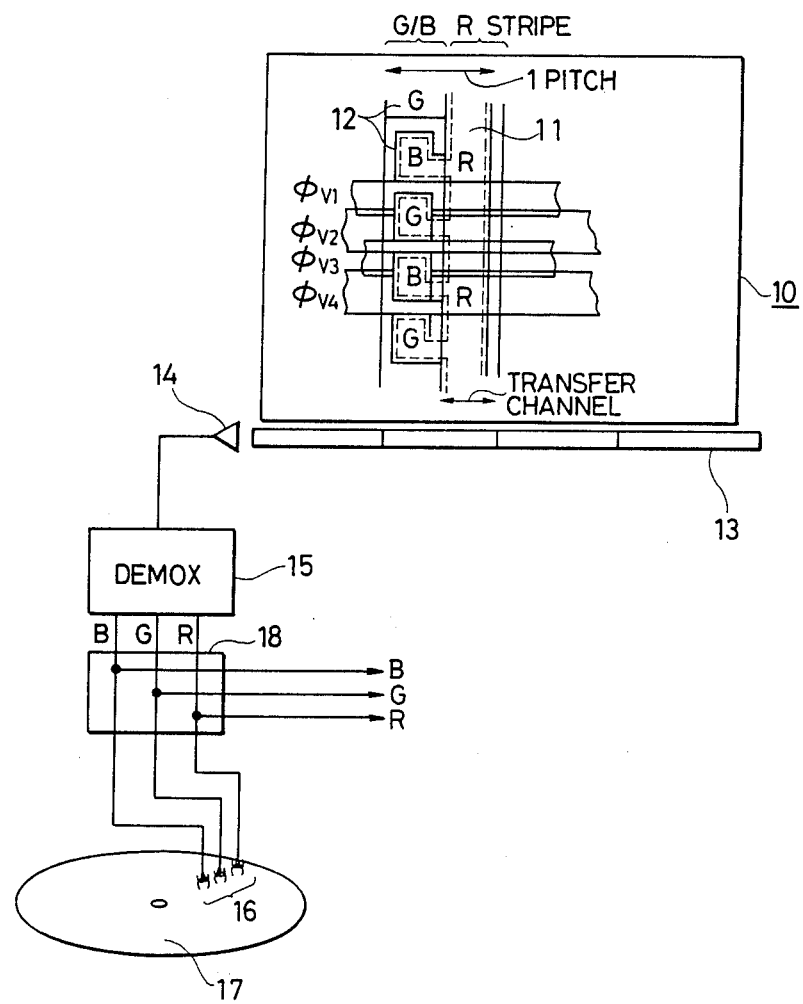
FIG. 1 is a diagram for explaining the conventional solid state image pickup element of the areasequential type and the conventional electronic still camera to which the element is applied.

FIG. 4 shows a reproduced output signal from each of the tracks on which R-, G-, and B-picture signals have been recorded by the apparatus of FIG. 1. The R-, G-, and B-picture signals are obtained by color separation by such an image pickup element which can produce picture signals in area sequence as described above with reference to FIG. 1.

That is, the reproduced outputs from the respective tracks on which the picture signals have been recorded in area sequence are sequentially and magnetically read as 1H signals. The number of 1H signals corresponds to that of the scanning lines of the solid state image pickup element, for example, field signals corresponding to 488 scanning lines. Field signals are recorded so that the odd number fields and the even number fields are alternately recorded every horizontal scanning period.

In the method of reading a still picture according to the present invention, in order to obtain one field picture from these reproduced outputs for a duration of 1/60 sec as an output signal to be supplied to a television receiver, a magnetic disk is rotated at a double speed, that is, at 3600 r.p.m. The same track is then scanned twice to thereby reproduce one frame picture. That is, in order to obtain an interlace signal from the reproduced outputs as described above, as illustrated in FIG. 5, the operation may be performed such that 1H signals in the odd numbered fields for example, 1, 3, 5, ... 487, are selected every horizontal scanning period during the first rotation of the magnetic disk to thereby form an odd number field picture. Thereafter, an even number field picture is formed from 1H signals in the even numbered fields, for example 2, 4, 6, ... 488 during the second rotation of the magnetic disk. Each of the 1H signals which have been simultaneously selected as described above has a waveform which is compressed in time base to be ½ of an ordinary television signal. Therefore, it is necessary to perform time base correction so as to doubly expand the time base as shown in FIG. 6.

Figure 7:
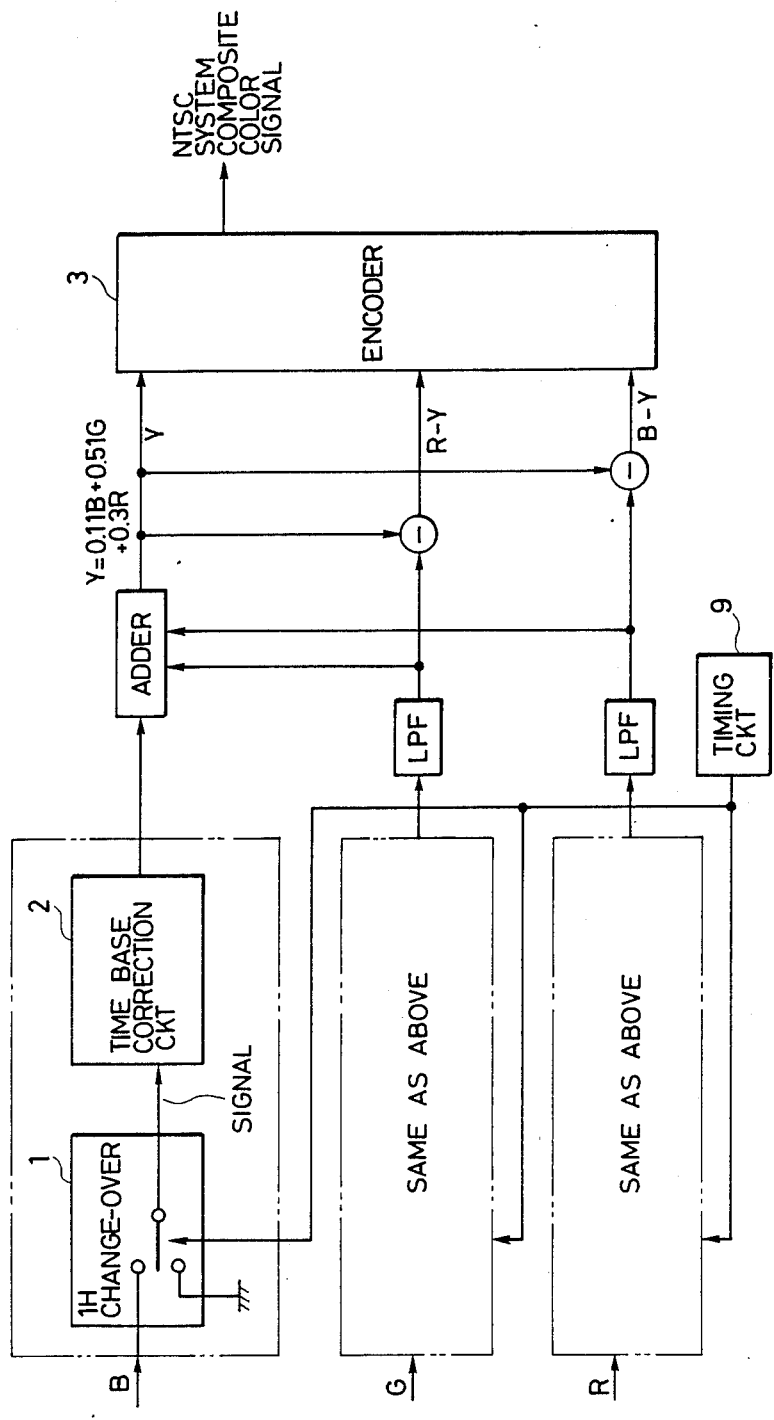
FIG. 7 is a diagram showing an embodiment of the circuit for realizing the method of reading a still picture according to the present invention.

FIG. 7 is a circuit block diagram showing an embodiment of the circuit for realizing the foregoing reproduction method according to the present invention.

Each of the R-, G-, and B-signals which are simultaneously reproduced from the magnetic disk is supplied to a time base correction circuit 2 through a 1H change-over SW 1. The time base correction circuits 1 and change-over switches are provided for every output line. The respective outputs of the time base correction circuits 2 are subject to ordinary signal processing.

That is, the R-, G-, and B-signals which have been time base expanded as shown in FIG. 6 are converted to obtain a luminance signal Y and color difference signals B-Y and R-Y through addition and substruction processing. The luminance signal Y and color difference signals B-Y and R-Y are transferred to a color encoder 3 so as to be combined into a composite video signal of the NTSC system. A synchronizing signal is mixed with the composite video signal so that a composite color video signal for an odd number field and a composite color video signal for an even-number field are sequentially transferred to a television receiver.

The 1H change-over switch 1 operates under the control of a timing circuit 9 so as in every horizontal scanning period to select a signal for only one field of either the odd number or the even number and to ignore a signal for the other field.

As the time base correction circuit 2, for example, it is possible to employ a BBD which has been conventionally used for time base compression/expansion of a waveform of an audio signal. The BBD is an analog variable delay element having a simple arrangement.

As described above, in the method of reading a still picture according to the present invention, an output from a magnetic disk on which picture signals are recorded in area sequence is subject to interlace scanning so as to be reproduced in a television receiver of the ordinary television system (NTSC, PAL, or SECAM system) so that a proper still picture can be watched by the television receiver.

What is claimed is:

1. An electronic still camera, comprising:

a CCD of a frame transfer type, said CCD having vertical picture elements substantially equal in number to television scanning lines, said CCD being arranged to be able to produce a picture signal corresponding to one frame;

means for reading out said picture signal corresponding to one frame at a first rate;

a field change-over means receiving said picture signal at said first rate for distributing the output of said CCD into a picture signal of an A-field and a picture signal of a B-field;

a delay circuit for delaying only one of said A-field picture signal and said B-field picture signal so as to make said A-field picture signal and B-field picture signal be in phase coincidence with each other;

a time base correction means for doubly expanding the time base of each of said A-field signal and said B-field signal to read out therefrom said A-field signal and said B-field signal at a second rate which is one half said first rate; and means for simultaneously recording said two field signals which are expanded in time base and made to be in phase on two tracks of a rotary magnetic recording medium by a two-channel head.

2. An electronic still camera as recited in claim 1, further comprising:

a dark box containing said CCD; and a focusing optical system for projecting an image onto said CCD.

3. An electronic still camera as recited in claim 1, wherein said first rate is 60 frames per second.

4. A method of recording a still picture from aCCD of the frame transfer type onto a rotary recording medium, comprising the steps of:

distributing an output of said CCD into a first picture signal of an A-field and into a second picture signal of a B-field at a first rate;

delaying only one of said first and second picture signals so that said first and second picture signals are in phase;

doubly expanding the time base of each of said first and second picture signals to produce said first and second picture signals at a second rate which is one-half said first rate; and simultaneously recording said time expanded and in phase first and second picture signals on separate tracks of said rotary recording medium.

* * * * *